May 26, 1936.           C. C. HARPSTER                2,042,226
                        OSCILLATING TOASTER
                        Filed July 10, 1934
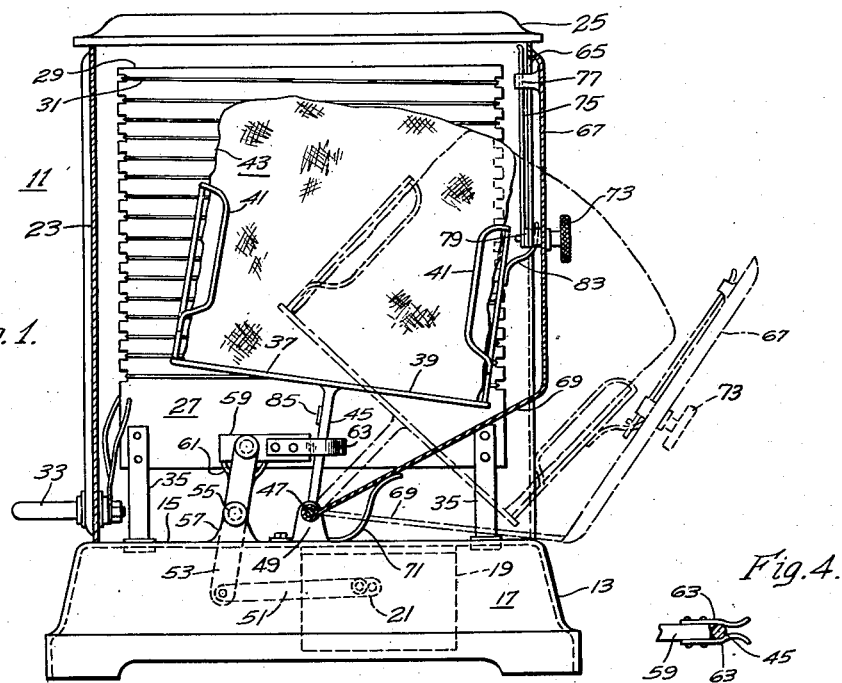
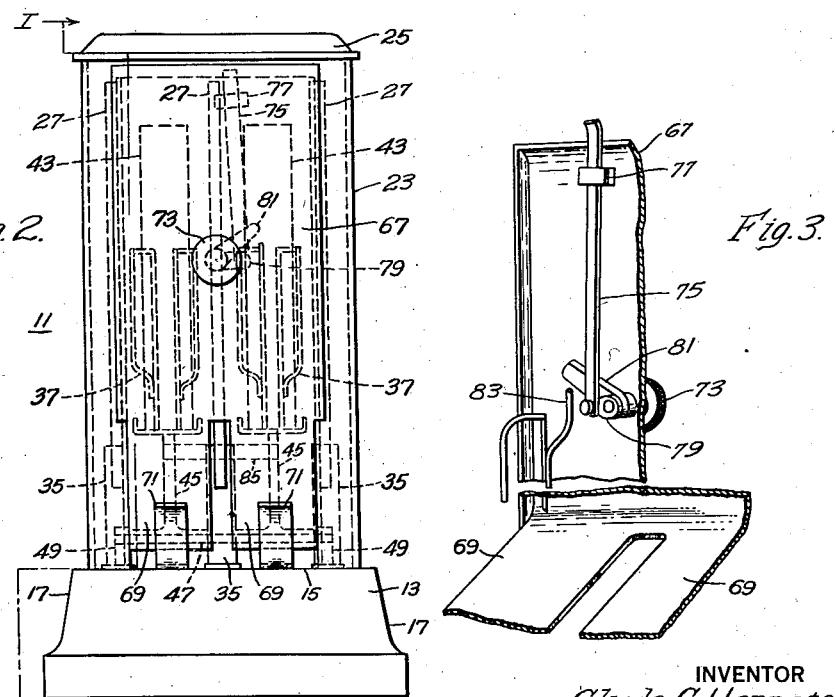
INVENTOR
Clyde C. Harpster.
BY
ATTORNEY Patented May 26, 1936

2,042,226

UNITED STATES PATENT OFFICE 2,042,226

OSCILLATING TOASTER

Clyde C. Harpster, Mansfield, Ohio, assignor to Westinghouse Electric & Manufacturing Company, East Pittsburgh, Pa., a corporation of Pennsylvania Application July 10, 1934, Serial No. 734,488

7 Claims. (Cl. 53—5)

My invention relates to electric cooking devices and particularly to electric toasters.

The main object of my invention is to provide a relatively simple construction for an electric toaster in which the bread slice support oscillates relatively to the heating element.

Other objects of my invention will either be apparent from the following description of one form of device embodying my invention or will be specifically pointed out hereinafter.

In practicing my invention, I provide a casing having a heating element and a pivotally mounted bread slice support therein, with power means of any desired kind to oscillate the bread slice support. I provide a yielding connection between the power means and the bread slice support to permit of moving the bread slice support partially out of the casing. I provide further a door for the opening in the casing resiliently urged to closed position and, in addition, provision for holding or locking the door in closed position and for permitting opening the door simultaneously with outward movement of the bread slice support, the door and the bread slice support being mounted on a common pivotal support.

In the accompanying single sheet of drawing,

Figure 1 is a view in vertical section through a toaster embodying my invention and taken on the line I—I of Fig. 2, Fig. 2 is a front elevational view of a toaster embodying my invention, Fig. 3 is a fragmentary view showing the door locking and actuating means, and Fig. 4 is a fragmentary view showing a resilient connection between the power means and the bread slice support.

A vertical toaster 11 comprises a hollow base 13 of the usual kind in that it includes an upper substantially flat surface 15 and side flanges 17, and I prefer to make the base high enough to be able to locate therein a power or motor means shown generally only and indicated by the numeral 19. This motor means may be either an electric motor or a clock mechanism, for example, and is effective to operate a small crank arm 21 rotating the same continuously at a relatively slow speed.

On the base 13 I locate a casing comprising a plurality of vertically extending walls 23, preferably made of sheet metal, and a cover 25. The side walls and the cover are made of thin sheet metal and may be of any shape and dimensions effective for the desired purpose. Any desired method of securing the casing walls 23 to the base top 15 may be employed and any desired means of securing the cover to the side walls may be utilized.

I provide a plurality of extended heating units 27 within the casing and, as shown particularly in Fig. 2 of the drawing, I may provide three such units, which are spaced apart suitable distances from each other to permit of locating therebetween, in a manner to be hereinafter set forth, a smaller number of slices of bread to be toasted. It is obvious that when three spaced extended heating units are provided, they will be properly operative to toast simultaneously two slices of bread. I have shown the heating element 27 as including a sheet 29 of electric insulating material such as mica on which is wound a wire or strip 31 of a suitable resistor material, the ends of which are connected to a pair of contact terminals 33 insulatedly mounted on one wall of the casing in a manner well known in the art. Only one such terminal pin 33 is, of course, visible in Fig. 1 of the drawing. The sheet 29 may be supported as by legs 35 from the top of the base 13, although I do not desire to be limited to the particular details of construction shown in the drawing.

I provide a plurality of bread slice supports, here shown as two in number and designated by numeral 37, which may comprise a flat sheet metal strip 39 to constitute the base thereof and wire and frames 41 extending at substantially right angles above the base 39 and bent to such skeleton shape as to provide supports not only for the ends of a slice of bread 43 to be supported thereby but also for the sides thereof. Each bread slice support 37 has a pivot arm 45 depending from the base plate or strip 39, which pivot arm is pivotally supported on a pin 47 supported by a plurality of bearing brackets 49 which are secured against the upper face of top 15 of the base.

The crank arm 21 of the motor means 19 has connected therewith a link 51 which engages a pivotally mounted arm 53 which, as shown particularly in Fig. 1 of the drawing, may be pivotally mounted intermediate its ends on a shaft 55 supported in brackets 57, which are mounted on the top 15. At its upper end the arm 53 is provided with a link 59 pivotally connected therewith, upwardly extending thin arms 61 disposed near the upper end of arm 53 being provided to maintain the arm 59 in a substantially horizontal position while permitting oscillating movement of the arm 53 as well as of arm 59. At its forward end, arm 59 is provided with two spring members 63 which are of such shape that the stem 45 of the bread slice support will be received therebetween and normally held against the end of arm 59 so that, upon oscillation of arms 53 and 59 by the motor means, the bread slice support will also be oscillated on the pivot shaft 47.

One wall of the casing is provided with a plurality of openings 65 therein corresponding in number to the number of bread slice supports, and a single pivotally mounted door 67 is provided to normally close said openings. The door 67 comprises a substantially vertically extending metal strip of such dimensions as to close the opening or openings in one of the walls 23 and may be provided with a plurality of downwardly and inwardly extending pivot arms 69 which are also supported by pivot shaft 47. A spring 71, here shown as of generally leaf shape, may have one end secured to the top 15 and have its other end normally engaging an arm 69 to yieldingly hold or tend to urge the door against the casing.

A knob 73 is mounted on the metal plate 67 of the door and may have turning movement relatively thereto. A locking bar 75 extends substantially vertically within the door 67 and may be moved vertically upwardly or downwardly in a guide bracket 77 by a short arm 79 secured to the inner part of knob 73. The knob 73 may be turned in one direction to cause the latching or locking bar 75 to move upwardly and inside of the front wall 23 just above the opening 65, as is shown more particularly in Fig. 1 of the drawing in order to lock the door in closed position.

A second arm 81 is also secured to the knob 73 on the inside of door 67 and is adapted to interfit with a wire 83 having one end thereof secured to one of the bread slice supports. The arm 81 is adapted to fit in back of the wire 83 and it will be noticed that when locking bar 75 and particularly the upper end thereof is in engagement with the inside face of the front wall of the casing, arm 81 is out of engagement with member 83. If the knob 73 is turned in such direction that locking bar 75 is moved downwardly, arm 81 will move in back of wire member 83 to engage the same and to thereby permit of simultaneous turning movement of the door and of the bread slice support with a slice of bread therein to the position shown in the broken lines in Fig. 1 of the drawing. Such operation of the door and of the bread slice supports is permitted by reason of the common pivotal mounting of the door and of the bread slice supports. It is further obvious that the resilient connection between the link 59 and the pivot arm 45 permits of disengaging the bread slice supports from the oscillating mechanism to permit of such movement away from the casing and also to permit of easy and quick reengagement of the oscillating mechanism and the bread slice supports. Any desired means for locking together the plurality of bread slice supports may be utilized, and I have indicated a cross bar 85 secured to the plurality of aligned pivot arms 45, although any other means effective for the same purpose may be utilized.

The amount of relative oscillatory movement between the heating element and the bread slice support need not be very large as I have found that even a small angular oscillating movement is sufficient to compensate for any inequalities in the mounting of the heating element relatively to the bread slice support or any inequalities in the distance between a heating element and a slice of bread, such as may be caused by a slice of bread not being of uniform thickness, but of more or less wedge shape. Such relative oscillatory movement results, as is shown by tests, in a more even toasting of a slice of bread irrespective of slight variations in the distance between a heating element and the surface of the slice of bread.

The device embodying my invention thus provides a relatively simple and effective means for oscillating a slice of bread or a plurality of such slices relatively to a heating element or heating elements while, at the same time, permitting of readily removing a toasted slice of bread from its support and locating a fresh slice of bread in the support.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In an electric toaster, in combination with a heating element and a bread slice support in heat-receiving relation to the heating element, a pivotal support for the bread slice support, a power-driven oscillatable element and a yielding connection between the oscillatable element and the bread slice support.

2. In an electric toaster, in combination with a casing having an opening therein, a heating element in the casing, a pivotally mounted bread slice support in heat-receiving relation to the heating element, a pivotally supported door for the opening in the casing, and a common pivotal supporting means for the bread slice support and the door to permit simultaneous movement of the door and bread slice support away from the casing.

3. In an electric toaster, in combination with a casing having an opening therein, a heating element in the casing, a bread slice support mounted for oscillating movement relatively to the heating element, a pivotally-mounted door for the opening in the casing, and means on the door having a portion engageable with the bread slice support to effect simultaneous movement of the door and the bread slice support away from the casing.

4. In an electric toaster, in combination with a casing having an opening therein, a heating element in the casing, a bread slice support mounted for oscillating movement relatively to the heating element, a pivotally-mounted door normally closing the opening in the casing, resilient means operatively engaging the door to urge it to closed position, and means on the door having a portion adapted to engage with the bread slice support to effect simultaneous movement of the door and the bread slice support away from the casing.

5. In an electric toaster, in combination with a casing having an opening therein, a heating element in the casing, a bread slice support mounted for oscillating movement relatively to the heating element, a pivotally-mounted door normally closing the opening in the casing, resilient means operatively engaging the door to urge it to closed position, and means on the door having a turning movement relatively thereto and adapted in one position to lock the door against the casing and in another position to engage with the bread slice support to cause simultaneous turning movement of the door and the bread slice support away from the casing.

6. In an electric toaster, in combination with a casing having an opening therein, a heating element in the casing, a pivotally-mounted bread slice support in the casing, power means for oscillating the bread slice support, a yielding connection between the power means and the bread slice support, a pivotally mounted door for the opening, and means on the door having two different operative positions and adapted in one position to lock the door against the casing and in another position to engage with the bread slice support to cause simultaneous turning movement of the door and the bread slice support away from the casing.

7. In an electric toaster, in combination with a casing having an opening therein, a heating element in the casing, a pivotally-mounted bread slice support in the casing, power means for oscillating the bread slice support, a yielding connection between the power means and the bread slice support, a pivotally mounted door for the opening, a knob on the door having turning movement relatively to the door, a locking bar associated with the knob to engage the casing to hold the door in closed position, and a catch associated with the knob and adapted to engage the bread slice support to effect simultaneous outward movement of the door and the bread slice support away from the casing.

CLYDE C. HARPSTER.